US011326489B1

United States Patent
Brazeel

(10) Patent No.: US 11,326,489 B1
(45) Date of Patent: May 10, 2022

(54) AIR-OIL SEPARATOR SYSTEM FOR A VEHICLE

(71) Applicant: Charles G. Brazeel, Fultondale, AL (US)

(72) Inventor: Charles G. Brazeel, Fultondale, AL (US)

( * ) Notice: Subject to any disclaimer, the term of this patent is extended or adjusted under 35 U.S.C. 154(b) by 0 days.

(21) Appl. No.: 17/136,142

(22) Filed: Dec. 29, 2020

(51) Int. Cl.
| | |
|---|---|
| *F01M 13/04* | (2006.01) |
| *F01M 13/00* | (2006.01) |
| *F01M 11/03* | (2006.01) |
| *F02M 35/10* | (2006.01) |
| *B01D 45/08* | (2006.01) |
| *F01M 11/12* | (2006.01) |
| *F01M 11/04* | (2006.01) |

(52) U.S. Cl.
CPC ......... *F01M 13/0011* (2013.01); *B01D 45/08* (2013.01); *F01M 11/04* (2013.01); *F01M 11/12* (2013.01); *F02M 35/10222* (2013.01); *F02M 35/10255* (2013.01)

(58) Field of Classification Search
CPC .......... F01M 13/04; F01M 2013/0438; F01M 13/0405; F01M 13/022; F01M 13/00; F01M 11/00; F01M 11/03; F01M 2013/0461; F01M 11/10; F01M 2013/0422
See application file for complete search history.

(56) References Cited

U.S. PATENT DOCUMENTS

| | | | | |
|---|---|---|---|---|
| 5,277,154 A | * | 1/1994 | McDowell | F01M 13/04 123/573 |
| 6,422,224 B1 | * | 7/2002 | Walker, Jr. | F01M 13/04 123/573 |
| 7,017,546 B1 | * | 3/2006 | Patel | F01M 13/04 123/198 C |
| 2008/0179230 A1 | * | 7/2008 | Brand | B01D 19/0063 210/188 |
| 2014/0158096 A1 | * | 6/2014 | Leone | F01M 13/00 123/563 |
| 2016/0265404 A1 | * | 9/2016 | Fujii | F01M 13/04 |
| 2018/0104632 A1 | * | 4/2018 | Schmelzle | B01D 46/2411 |
| 2018/0216507 A1 | * | 8/2018 | Mainiero | F01M 13/0405 |
| 2018/0306077 A1 | * | 10/2018 | Mainiero | F02M 35/10222 |
| 2020/0306697 A1 | * | 10/2020 | Kutowy | B01D 61/08 |

* cited by examiner

*Primary Examiner* — Long T Tran
(74) *Attorney, Agent, or Firm* — Taylor English Duma LLP

(57) ABSTRACT

The present invention comprises an apparatus and method for replacing an original equipment manufacturer air-oil separator apparatus having an integral pressure control valve ("OEM-AOS" system) in a vehicle. The OEM-AOS system is disconnected from the engine air intake. The integral pressure control valve is disabled. An accumulator for collecting oil from by-pass combustion gas is connected to the OEM-AOS system. A discrete pressure control valve ("discrete-PCV") is connected to the accumulator and to the engine air intake. The discrete-PCV is located within the vehicle at an easily accessible location so that it can be quickly accessed and replaced when necessary. The accumulator includes a sensor that is operable to send a warning signal to a vehicle operator when the vehicle needs to be serviced to remove condensed oil from the accumulator.

10 Claims, 2 Drawing Sheets

AIR-OIL SEPARATOR SYSTEM FOR A VEHICLE

FIELD OF THE INVENTION

This disclosure relates to air-oil separator systems, and, more particularly, to an improved air-oil separator apparatus designed to replace an existing air-oil separator apparatus in a vehicle, and related methods.

BACKGROUND OF THE INVENTION

In an internal combustion engine, air and fuel combust to drive pistons and crankshafts and thereby provide power to a vehicle. During combustion, high pressure pushes hot combustion gases, known as "blow-by", past the piston rings and into the crankcase of the vehicle. The blow-by is pulled from the crankcase and routed back to the engine air intake. The blow-by typically includes vaporized oil and fuel. Many vehicles employ an air-oil separator system to filter the blow-by and thereby minimize the amount of oil that reaches the intake. Failure to adequately remove oil from the blow-by will damage internal parts of the engine over time, reducing engine performance and ultimately leading to engine failure.

An original equipment manufacturer (OEM) air-oil separator (AOS) system functions as a filter to remove the vaporized oil from the combustion gas so that the filtered gas can be returned back into the combustion process with minimal oil. These OEM-AOS systems typically include an integral pressure control valve (PCV), also known as a breather valve or oil separator valve, that regulates the flow rate of the blow-by (see e.g., Porsche Air Oil Separator Part No. 99610702651). The PCV includes a diaphragm that will periodically fail and must be repaired or replaced or oil will escape the OEM-AOS system and damage internal parts of the engine as noted above.

Because of the compact nature of engines and their components, OEM-AOS systems are commonly difficult to access. Consequently, repair or replacement of the OEM-AOS system can be very time-consuming, resulting in significant vehicular downtime and repair costs. Examples of OEM-AOS systems that are difficult to access for repair or replacement are found in the Porsche 911 model car series 996 (manufactured from 1997 to 2006) and series 997.1 (manufactured from 2005 to 2008).

Accordingly, there is a need for an improved air-oil separator system designed to replace an existing OEM-AOS system in a vehicle to allow ease of access for repair or replacement of worn or defective pressure control valves.

BRIEF SUMMARY OF THE INVENTION

These and other needs and disadvantages may be overcome by the apparatus and methods disclosed herein. Additional improvements and advantages may be recognized by those of ordinary skill in the art upon study of the present disclosure.

The present invention comprises an apparatus and method for replacing an original equipment manufacturer ("OEM") air-oil separator ("AOS") apparatus having an integral pressure control valve ("integral-PCV") in a vehicle (collectively, an "OEM-AOS" apparatus or system). According to the preferred embodiment of the present invention, the OEM-AOS system is disconnected from the engine air intake. Next, the integral-PCV is disabled, preferably by sealing the atmospheric port. Next, an accumulator is connected to the OEM-AOS system such that the accumulator is in fluid communication with the OEM-AOS system. Next, a discrete pressure control valve ("discrete-PCV"), which is separate and distinct from other components, is connected to the accumulator such that the discrete-PCV is in fluid communication with the accumulator. Next, the discrete-PCV is connected to the engine air intake such that the discrete-PCV is in fluid communication with the engine air intake. The discrete-PCV is located within the vehicle at an easily accessible location so that it can be quickly accessed and replaced when necessary. The accumulator is operable to remove vaporized oil from the by-pass combustion gas and return "filtered" combustion gas to the engine air intake. The accumulator includes a sensor that is operable to send a warning signal to a vehicle operator when the vehicle needs to be serviced to remove condensed oil from the accumulator.

This summary is presented to provide a basic understanding of some aspects of the apparatus and methods disclosed herein as a prelude to the detailed description that follows below. Accordingly, this summary is not intended to identify key elements of the apparatus and methods disclosed herein or to delineate the scope thereof.

Figure 1:
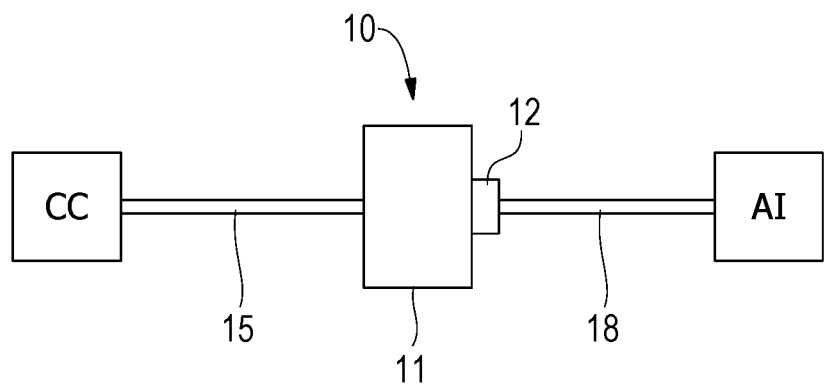
FIG. 1 is a schematic view of a prior art OEM-AOS system.

The Figures are exemplary only, and the implementation illustrated therein is selected to facilitate explanation. The number, position, relationship and dimensions of the elements shown in the Figures to form the implementation described herein, as well as dimensions and dimensional proportions to conform to specific force, weight, strength, flow and similar requirements, are explained herein or are understandable to a person of ordinary skill in the art upon study of this disclosure. Where used in the various Figures, the same numerals designate the same or similar elements. Furthermore, when the terms "top," "bottom," "right," "left," "front," "rear," "first," "second," "interior," "exterior," and similar terms are used, the terms should be understood in reference to the orientation of the implementation shown in the drawings and are utilized to facilitate description thereof. Use herein of relative terms such as generally, about, approximately, essentially, may be indicative of engineering, manufacturing, or scientific tolerances such as ±0.1%, ±1%, ±2.5%, ±5%, or other such tolerances, as would be recognized by those of ordinary skill in the art upon study of this disclosure.

DETAILED DESCRIPTION OF THE INVENTION

The present invention comprises an apparatus and method for replacing an original equipment manufacturer (OEM) air-oil separator (AOS) apparatus having an integral pressure control valve in a vehicle. The existing original equipment manufacturer air-oil separator apparatus having an integral pressure control valve will be referred to herein as an "OEM-AOS" apparatus or system.

FIG. 1 shows a prior art system having an OEM-AOS system 10 that includes an air-oil separator 11 having an integral pressure control valve 12 (referred to herein as an "integral-PCV"). The OEM-AOS system 10 is connected to the crankcase CC of a vehicle engine via crankcase connector tube 15 to receive by-pass combustion gas from the crankcase CC. The OEM-AOS system 10 is connected to the engine air intake AI via intake connector tube 18 to discharge by-pass combustion gas to the engine air intake AI.

Figure 2:
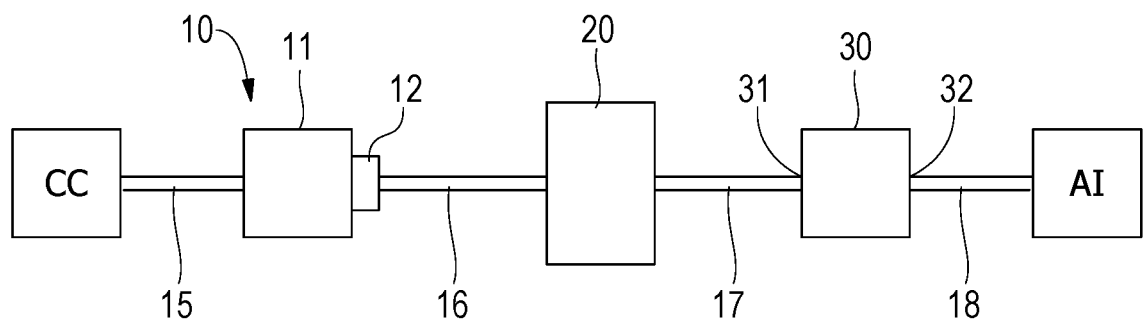
FIG. 2 is a schematic view of a preferred embodiment of the present invention implemented into the OEM-AOS system of FIG. 1.

FIG. 2 shows the preferred embodiment of the present invention implemented into the OEM-AOS system 10 shown in FIG. 1. According to the preferred embodiment of the present invention, the OEM-AOS system 10 is disconnected from the engine air intake AI preferably by disconnecting the intake connector tube 18 from the integral-PCV 12. Next, the integral-PCV 12 is disabled, preferably by sealing the atmospheric port (not shown). Next, an accumulator 20, described in more detail below, is secured to the vehicle preferably with a mounting bracket (not shown) or the like. The accumulator 20 is connected to the OEM-AOS system 10 with a first connector tube 16 such that the accumulator 20 is in fluid communication with the OEM-AOS system 10, preferably through the disabled integral-PCV 12, which now simply functions as a flow through device for the by-pass combustion gas.

Next, a discrete pressure control valve 30 (referred to herein as a "discrete-PCV"), which is separate and distinct from other components, is connected to the accumulator 20 with a second connector tube 17 such that an inlet port 31 of the discrete-PCV 30 is in fluid communication with the accumulator 20. Next, the discrete-PCV 30 is connected to the engine air intake AI preferably with the intake connector tube 18 such that an outlet port 32 of the discrete-PCV 30 is in fluid communication with the engine air intake AI. The discrete-PCV 30 is located within the vehicle at an easily accessible location so that it can be quickly accessed and replaced when necessary. The discrete-PCV is preferably an off-the-shelf pressure control valve suitable for the vehicle being modified, such devices being well known. An example of a pressure control valve suitable for use as a discrete-PCV in a Porsche 911 model car series 996 or series 997.1 is a Volkswagen Pressure Control Valve Mfg. Part No. 077103245B.

Figure 3:
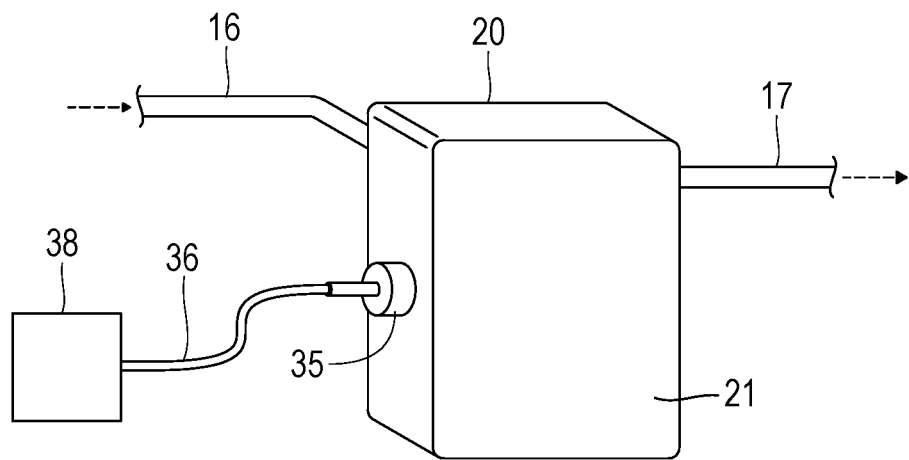
FIG. 3 is a perspective view of a preferred accumulator of the present invention.
Figure 4:
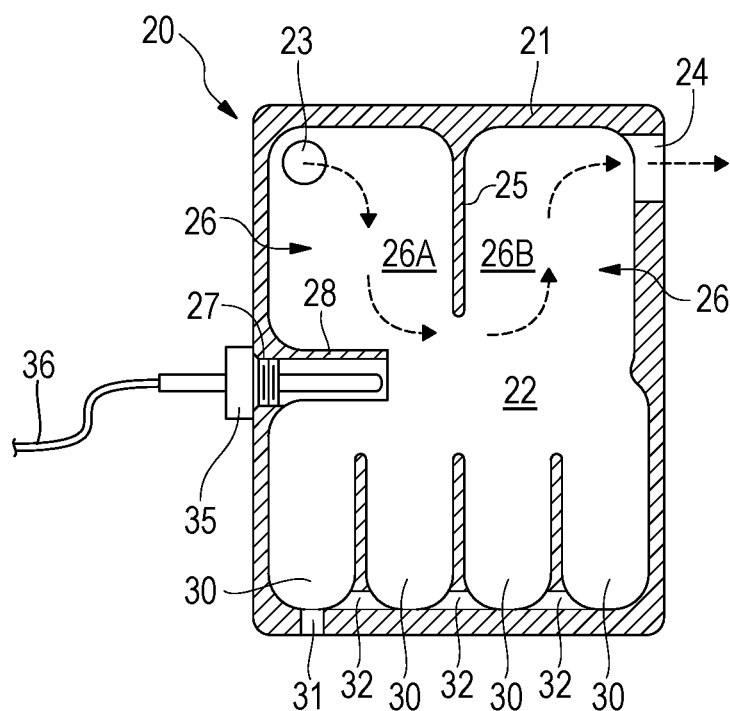
FIG. 4 is a sectional view of the preferred accumulator of FIG. 3.

FIGS. 3 and 4 show the preferred accumulator 20 of the present invention. The accumulator 20 comprises a housing 21 having an interior chamber 22, a first opening 23 through an upper end of the housing 21 for receiving combustion gas including vaporized oil into the interior chamber 22, and a second opening 24 through the upper end of the housing 21 for discharging combustion gas out of the interior chamber 22. The accumulator 20 further comprises a divider 25 extending from the top of the interior chamber 22 between the first opening 23 and the second opening 26, the divider 25 separating an upper portion 26 of the interior chamber 22 into a first upper sub-chamber 26A and a second upper sub-chamber 26B. The divider 25 is operable to control the flow of combustion gas from the first opening 23 to the second opening 24 and thereby promote condensation of the vaporized oil.

The accumulator 20 further comprises a sensor port 27 through a side of the housing 21 and an arcuate cover 28 mounted superjacent the sensor port 27 to protect a sensor 35 extending through the sensor port 27. The accumulator 20 further comprises a plurality of wells 30 formed along a lower portion of the interior chamber 22, the plurality of wells 30 adapted to collect condensed oil. A sealable drain port 31 through a bottom of the housing 21 is adapted to drain the condensed oil from the interior chamber 22. The drain port 31 is in fluid communication with the plurality of wells 30 through a series of slots 32.

The sensor 35 extends through the sensor port 27 and is in electrical communication with a controller 38, such as an onboard vehicular computer, through an electrical connector 36. The sensor 35 is operable to send a warning signal to the controller 38 when a volume of condensed oil in the interior chamber 22 reaches a predetermined level. The plurality of wells 30 helps prevent the condensed oil from sloshing around within the interior chamber 22 as the vehicle moves about, thus avoiding the condensed oil from impacting the sensor when the condensed oil is below the predetermined level. The controller 38 is operable to display a warning so that a vehicle operator knows to service the vehicle to remove condensed oil from the accumulator 20. In addition, the controller 38 can send the warning to a remote device, such as a smart phone. The sensor 35 is preferably an off-the-shelf optical liquid level sensor, such devices being well known.

The foregoing discussion along with the Figures discloses and describes an exemplary implementation. This implementation is not meant to limit the scope of coverage, but, instead, to assist in understanding the context of the language used in this specification and in the claims. The Abstract is presented to meet requirements of 37 C.F.R. § 1.72(b) only. Accordingly, the Abstract is not intended to identify key elements of the apparatus and methods disclosed herein or to delineate the scope thereof. Upon study of this disclosure and the exemplary implementation herein, one of ordinary skill in the art may readily recognize that various changes, modifications and variations can be made thereto without departing from the spirit and scope of the inventions as described herein and as defined in the following claims.

The invention claimed is:

1. A method for replacing an OEM-AOS system having an integral pressure control valve in a vehicle, the OEM-AOS system connected to a combustion gas line between an engine crankcase and an engine air intake, comprising the steps of:
   a. providing an accumulator, comprising:
      i. a housing having an interior chamber;
      ii. a first opening through an upper end of the housing for receiving combustion gas into the interior chamber, the combustion gas including vaporized oil;
      iii. a second opening through an upper end of the housing for discharging combustion gas out of the interior chamber;
      iv. a divider extending from an upper end of the housing between the first opening and the second opening, the divider separating an upper portion of the interior chamber into a first upper sub-chamber and a second upper sub-chamber;
      v. a sensor port through a side of the housing;
      vi. an optical liquid level sensor extending through the sensor port, the sensor in electrical communication with an onboard computer of the vehicle;
      vii. an arcuate cover mounted within the interior chamber and immediately superjacent the sensor port to protect the sensor;
      viii. a plurality of wells formed along a lower portion of the interior chamber, the plurality of wells adapted to collect condensed oil, the plurality of wells further adapted to prevent the condensed oil from sloshing around within the interior chamber as the vehicle moves about and thereby prevent the condensed oil from impacting the sensor when the condensed oil is below a predetermined level; and
ix. a sealable drain port through a bottom of the housing, the drain port adapted to drain the condensed oil from the interior chamber, the drain port in fluid communication with the plurality of wells through a series of slots;
x. wherein the divider is operable to control flow of combustion gas from the first opening to the second opening and thereby promote condensation of the vaporized oil;
xi. wherein the sensor is operable to send a warning signal to the onboard computer when an amount of condensed oil in the interior chamber reaches the predetermined level;
b. providing a discrete pressure control valve;
c. disconnecting the OEM-AOS system from the engine air intake and leaving the OEM-AOS system connected to the engine crankcase;
d. disabling the integral pressure control valve of the OEM-AOS system so that the integral pressure control valve does not affect flow of combustion gas through the OEM-AOS system;
e. attaching the accumulator to the vehicle;
f. connecting the accumulator to the disabled integral pressure control valve of the OEM-AOS system with a first connector such that the accumulator first opening is in fluid communication with the disabled integral pressure control valve of the OEM-AOS system through the first connector;
g. connecting the discrete pressure control valve to the accumulator with a second connector such that an inlet port of the discrete pressure control valve is in fluid communication with the accumulator second opening through the second connector, wherein the discrete pressure control valve is located at an easily accessible location on the vehicle; and
h. connecting an outlet port of the discrete pressure control valve to the engine air intake.

2. The method according to claim 1, wherein the vehicle is a Porsche 911 model car selected from the series consisting of series 996 and series 997.1.

3. A method for replacing an OEM-AOS system having an integral pressure control valve in a vehicle, the OEM-AOS system connected to a combustion gas line between an engine crankcase and an engine air intake, comprising the steps of:
a. providing an accumulator, comprising:
i. a housing having an interior chamber;
ii. a first opening through an upper end of the housing for receiving combustion gas into the interior chamber, the combustion gas including vaporized oil;
iii. a second opening through an upper end of the housing for discharging combustion gas out of the interior chamber;
iv. a divider extending from an upper end of the housing between the first opening and the second opening, the divider separating an upper portion of the interior chamber into a first upper sub-chamber and a second upper sub-chamber;
v. a sensor port through a side of the housing;
vi. a sensor extending through the sensor port, the sensor in electrical communication with an onboard computer of the vehicle;
vii. at least one well formed along a lower portion of the interior chamber, the at least one well adapted to collect condensed oil; and
viii. a sealable drain port through a bottom of the housing, the drain port adapted to drain the condensed oil from the interior chamber, the drain port in fluid communication with the least one well;
ix. wherein the divider is operable to control flow of combustion gas from the first opening to the second opening and thereby promote condensation of the vaporized oil;
x. wherein the sensor is operable to send a warning signal to the onboard computer when an amount of condensed oil in the interior chamber reaches a predetermined level;
b. providing a discrete pressure control valve;
c. disconnecting the OEM-AOS system from the engine air intake and leaving the OEM-AOS system connected to the engine crankcase;
d. disabling the integral pressure control valve of the OEM-AOS system so that the integral pressure control valve does not affect flow of combustion gas through the OEM-AOS system;
e. attaching the accumulator to the vehicle;
f. connecting the accumulator to the disabled integral pressure control valve of the OEM-AOS system with a first connector such that the accumulator first opening is in fluid communication with the disabled integral pressure control valve of the OEM-AOS system through the first connector;
g. connecting the discrete pressure control valve to the accumulator with a second connector such that an inlet port of the discrete pressure control valve is in fluid communication with the accumulator second opening through the second connector, wherein the discrete pressure control valve is located at an easily accessible location on the vehicle; and
h. connecting an outlet port of the discrete pressure control valve to the engine air intake.

4. The method according to claim 3, wherein the sensor is an optical liquid level sensor.

5. The method according to claim 3, wherein the accumulator further comprises an arcuate cover mounted within the interior chamber and immediately superjacent the sensor port to protect the sensor.

6. The method according to claim 3, wherein the at least one well comprises a plurality of wells adapted to prevent the condensed oil from sloshing around within the interior chamber as the vehicle moves about and thereby prevent the condensed oil from impacting the sensor when the condensed oil is below the predetermined level, and wherein the drain port is in fluid communication with the plurality of wells through a series of slots.

7. The method according to claim 3, wherein the vehicle is a Porsche 911 model car selected from the series consisting of series 996 and series 997.1.

8. A method for replacing an OEM-AOS system having an integral pressure control valve in a vehicle, the OEM-AOS system connected to a combustion gas line between an engine crankcase and an engine air intake, comprising the steps of:
a. providing an accumulator, comprising:
i. a housing having an interior chamber;
ii. a first opening through an upper end of the housing for receiving combustion gas into the interior chamber, the combustion gas including vaporized oil;
iii. a second opening through an upper end of the housing for discharging combustion gas out of the interior chamber;

iv. at least one well formed along a lower portion of the interior chamber, the at least one well adapted to collect condensed oil; and v. a sealable drain port through a bottom of the housing, the drain port adapted to drain the condensed oil from the interior chamber, the drain port in fluid communication with the least one well;

b. providing a discrete pressure control valve;

c. disconnecting the OEM-AOS system from the engine air intake and leaving the OEM-AOS system connected to the engine crankcase;

d. disabling the integral pressure control valve of the OEM-AOS system so that the integral pressure control valve does not affect flow of combustion gas through the OEM-AOS system;

e. attaching the accumulator to the vehicle;

f. connecting the accumulator to the disabled integral pressure control valve of the OEM-AOS system with a first connector such that the accumulator first opening is in fluid communication with the disabled integral pressure control valve of the OEM-AOS system through the first connector;

g. connecting the discrete pressure control valve to the accumulator with a second connector such that an inlet port of the discrete pressure control valve is in fluid communication with the accumulator second opening through the second connector, wherein the discrete pressure control valve is located at an easily accessible location on the vehicle; and h. connecting an outlet port of the discrete pressure control valve to the engine air intake.

9. The method according to claim 8, wherein the at least one well comprises a plurality of wells adapted to prevent the condensed oil from sloshing around within the interior chamber as the vehicle moves about, and wherein the drain port is in fluid communication with the plurality of wells through a series of slots.

10. The method according to claim 8, wherein the vehicle is a Porsche 911 model car selected from the series consisting of series 996 and series 997.1.

\* \* \* \* \*